Figure 1:
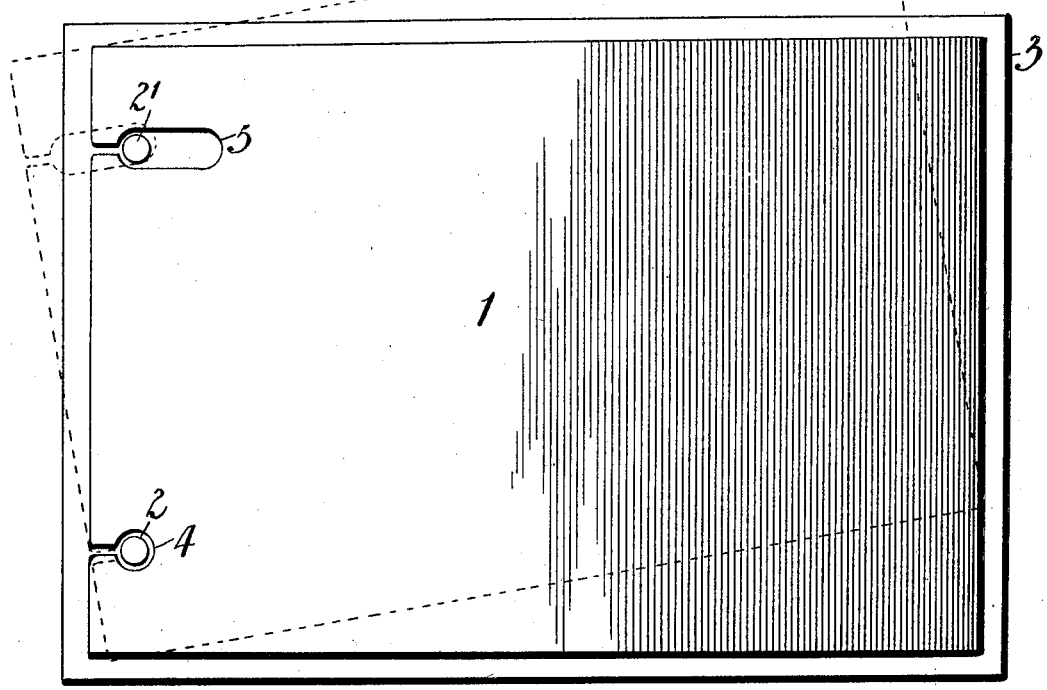

No. 792,747. PATENTED JUNE 20, 1905.
D. C. ANDERSON, E. WIENSS & R. D. MILLER.
ADJUSTABLE LEAF BINDER STRUCTURE.
APPLICATION FILED MAR. 10, 1905.

2 SHEETS—SHEET 1.

WITNESSES:

INVENTORS
D. C. Anderson
Ernst Wienss
R. D. Miller
By
Attorneys

No. 792,747. PATENTED JUNE 20, 1905.
D. C. ANDERSON, E. WIENSS & R. D. MILLER.
ADJUSTABLE LEAF BINDER STRUCTURE.
APPLICATION FILED MAR. 10, 1905.

2 SHEETS—SHEET 2.

WITNESSES:

INVENTORS
D. C. Anderson
Ernst Wienss
R. D. Miller
BY
Dudley, Thoms & Norton
Attorneys No. 792,747.

Patented June 20, 1905.

UNITED STATES PATENT OFFICE.

DON CLARENCE ANDERSON, ERNST WIENSS, AND RICHARD DALE MILLER, OF SPOKANE, WASHINGTON.

ADJUSTABLE-LEAF-BINDER STRUCTURE.

SPECIFICATION forming part of Letters Patent No. 792,747, dated June 20, 1905.

Application filed March 10, 1905. Serial No. 249,488.

*To all whom it may concern:*

Be it known that we, DON CLARENCE ANDERSON, ERNST WIENSS, and RICHARD DALE MILLER, citizens of the United States, residing at Spokane, in the county of Spokane and State of Washington, have invented certain new and useful Improvements in Adjustable-Leaf-Binder Structures; and we do hereby declare the following to be a full, clear, and exact description of the invention, such as will enable others skilled in the art to which it appertains to make and use the same.

This invention consists of an adjustable-leaf-binder structure, and has for its object the production of a device of this character constructed to permit a horizontally-adjusted change of position without disconnection of any leaf relative to the position of other leaves, the leaves being in superimposed relation one to the other, whereby the adjusted leaves are self-maintained in position.

The invention in detail is set forth in the following description and illustrated in the accompanying drawings. A number of constructions of leaves forming a part of the invention are presented, and the construction may be still further modified without departing from the spirit of the invention defined by the concluding claim. Hence no limitation is intended by the showing in the drawings and specification.

In the drawings, Figure 1 is a plan view of a loose-leaf binder or book and a leaf or leaves embodying the invention. Figs. 2, 3, 4, 5, 6, 7, 8, and 9 are views of the binding ends of sheets forming a part of the invention, but showing modifications.

Referring to the drawings by numerals, 1 designates what may be termed a "loose" leaf adapted to be bound or held by the pins or the like 2 2' of a binder or book 3, said pins or the like passing through holes made in the binding end of the sheet and which may be closed or have an entering-slit, dependent upon the method to be followed in inserting the sheets.

Figure 2:
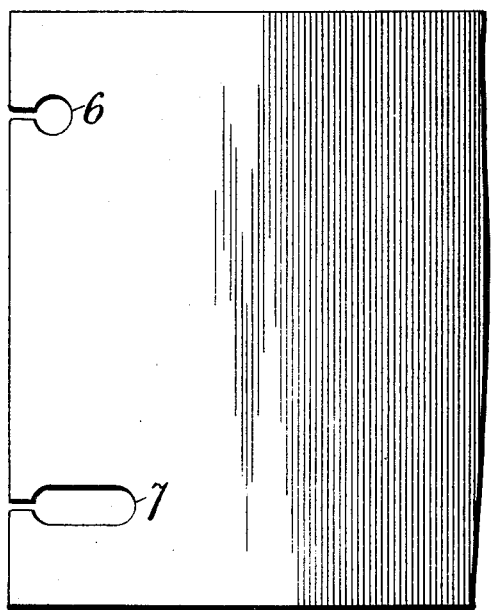
Figure 3:
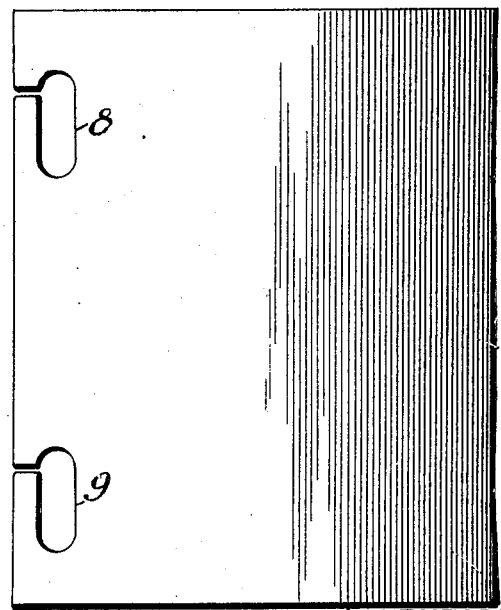
Figure 4:
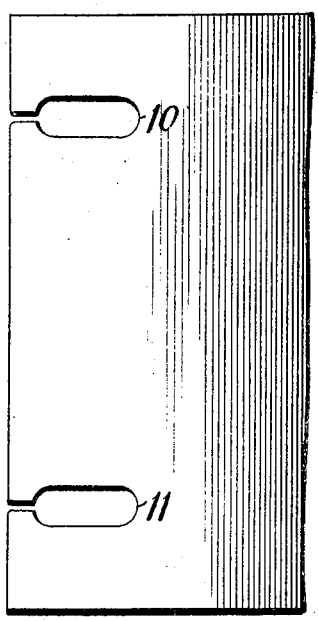
Figure 5:
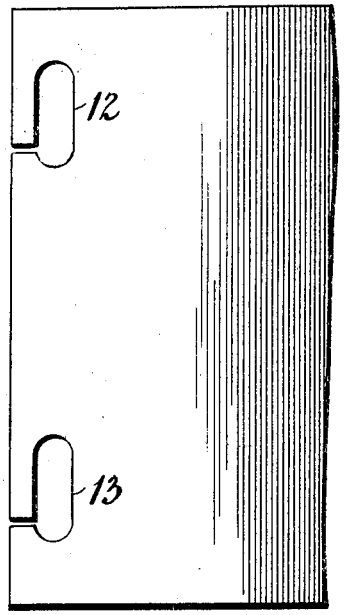
Figure 6:
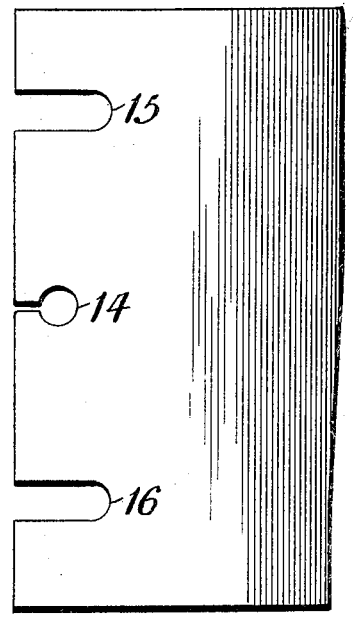
Figure 7:
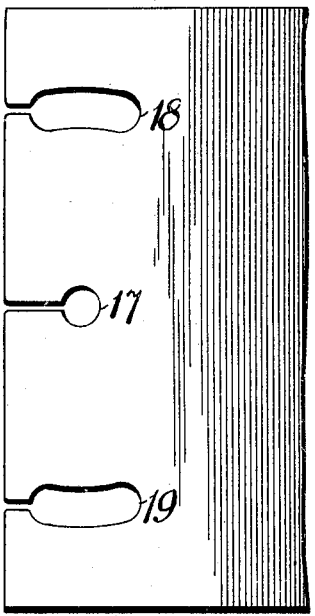
Figure 8:
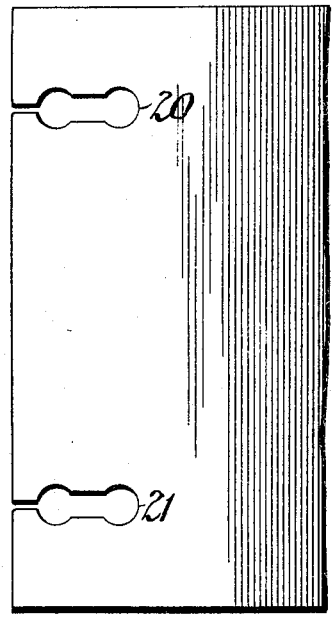
Figure 9:
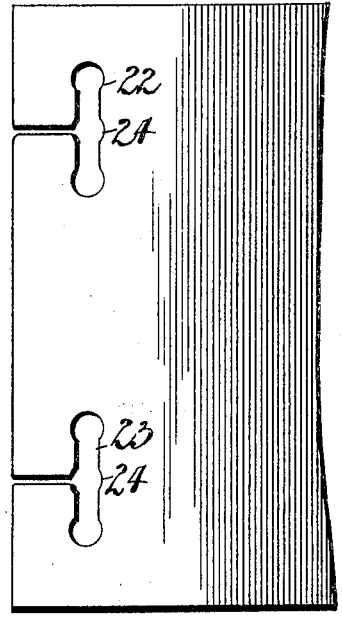

The improvement consists in providing, in connection with a binder such as is shown, a sheet with one or more elongated holes or slots to receive the pins or the like, whereby the sheet may be shifted in any desired direction to a position which will bring its outer edge or edges beyond the outer edge or edges of other of the sheets, and this regardless of whether the binding edge is at the top or side. In Fig. 1 the lower hole 4 may be of the usual construction; but the upper hole 5 is in the form of a horizontal slot, and this permits of the leaf being swung out and up, the pin 2 serving as the pivot. Fig. 2 shows a leaf with an upper circular hole 6 and a lower slot 7, permitting the leaf to be swung in a direction opposite to that of the leaf shown in Fig. 1. In Fig. 3 is illustrated a leaf provided with vertical slots 8 9, allowing it to be shifted to a position above or below other of the leaves, and in Fig. 4 two horizontal slots 10 11 are provided to allow the leaf to be shifted to the right. The sheet shown in Fig. 5 is similar to that in Fig. 3, with the difference that the slits are at the bases of the vertical slots 12 and 13. In Fig. 6 is shown a sheet having a central hole 14 flanked by elongated notches 15 16, extending to the edge of the sheet and permitting the swinging of the sheet in the two directions. A construction similar to that shown in Fig. 6 is exhibited in Fig. 7, wherein a central circular hole 17 is formed between slots 18 19, which are slightly inclined, the degree of inclination being determined by the relative locations of the perforations. This sheet, as well as the sheet shown in Fig. 6, may be reversed to permit of the use of both sides of the sheet. Fig. 8 shows a leaf equipped with horizontally-disposed slots 20 21 of dumb-bell form, and in Fig. 9 the slots 22 23 are of dumb-bell form and vertical and have each an enlargement 24 centrally and to which the slit leads.

As above stated, the slots and circular perforations may be open or closed, dependent upon the method employed in inserting the leaves. With the leaves in normal position all are in alinement, whereas it is the purpose of this invention to obtain the segregation of accounts into separate classes or divisions and to indicate the same by moving the leaves into an extended position and without detaching them from the binder or book. With certain of the leaves so positioned it becomes an easy matter to readily secure, for example, a daily balance on customers' ledgers without extending or figuring over the dead or inactive accounts; also, to indicate past-due accounts on mercantile ledgers and to classify accounts in any way desired on other ledgers and registers.

We claim—

An adjustable-leaf-binder structure comprising in combination, a binder having a horizontally-disposed base and binder-pins extending vertically therefrom, a plurality of leaves provided along one edge with a plurality of apertures through which the pins thread, said apertures being formed to prevent horizontal disconnection of the leaves from the pins but permitting a horizontally-adjusted change of position of any leaf relative to the position of other leaves, said leaves being in superimposed relation one to the other whereby the adjusted leaves are self-maintained in position.

In testimony whereof we affix our signatures in presence of two witnesses.

DON CLARENCE ANDERSON.
  ERNST WIENSS.
  RICHARD DALE MILLER.

Witnesses:
  E. J. ARMSTRONG,
  PEARLE E. THAYER.